(12) United States Patent
Ono et al.

(10) Patent No.: US 12,319,125 B2
(45) Date of Patent: Jun. 3, 2025

(54) HEATER FOR AIRBAG DEVICE

(71) Applicant: TOYODA GOSEI CO., LTD., Kiyosu (JP)

(72) Inventors: Rie Ono, Aichi-ken (JP); Toshihiko Asai, Aichi-ken (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/897,634

(22) Filed: Sep. 26, 2024

(65) Prior Publication Data

US 2025/0100351 A1    Mar. 27, 2025

(51) Int. Cl.
  *B60H 1/22*     (2006.01)
  *B60R 21/2165*  (2011.01)
  *B60R 21/237*   (2006.01)

(52) U.S. Cl.
  CPC ....... *B60H 1/2215* (2013.01); *B60R 21/2165* (2013.01); *B60R 21/237* (2013.01)

(58) Field of Classification Search
  CPC .............. B60R 21/2165; B60R 21/237; B60R 2021/21537; B60R 21/215; B60R 2021/23509; B60H 1/2215; B29K 2307/04; B29L 2031/3038; B32B 2262/106; B32B 2605/003; B32B 3/266
  See application file for complete search history.

(56) References Cited

U.S. PATENT DOCUMENTS

2019/0277893 A1    9/2019    Kashiwaya

FOREIGN PATENT DOCUMENTS

| JP | 2006131186 A | * | 5/2006 | .......... B60R 21/206 |
| JP | 2010-023567 A | | 2/2010 | |
| JP | 2016147546 A | * | 8/2016 | .............. B60H 1/22 |
| WO | WO-2013050621 A2 | * | 4/2013 | ............. B60N 2/002 |
| WO | 2018/116679 A1 | | 6/2018 | |
| WO | WO-2022189336 A1 | * | 9/2022 | |

OTHER PUBLICATIONS

Amorim, WO-2022189336-A1, Machine Translation of Specification (Year: 2022).*
Guan, JP-2016147546-A, Machine Translation of Specification (Year: 2016).*
Atsushi, JP-2006131186-A, Machine Translation of Specification (Year: 2006).*
Wittkowski, WO-2013050621-A2, Machine Translation of Specification (Year: 2013).*

* cited by examiner

*Primary Examiner* — Drew J Brown
*Assistant Examiner* — Matthew Joseph Ganci
(74) *Attorney, Agent, or Firm* — Posz Law Group, PLC

(57) ABSTRACT

A heater for an airbag device includes a sheet-shaped heater body including a heat generation unit, and disposed to cover a vehicle interior surface side of an airbag cover and configured to generate heat to emit the radiation heat. The heater body is formed of a flexible woven fabric including a warp and a weft, and is provided with a dividing scheduled portion configured to be divided at a time of opening of a door portion at a position corresponding to the breakage scheduled portion formed in the airbag cover. The dividing scheduled portion is provided with, substantially along the breakage scheduled portion, main slits that are intermittently provided and sub slits disposed on at least one side of the main slits. The sub slits are disposed in the woven fabric to cut the warp or the weft implementing a portion of a coupling portion formed between the main slits.

6 Claims, 9 Drawing Sheets

HEATER FOR AIRBAG DEVICE

CROSS-REFERENCE TO RELATED APPLICATIONS

This application is based on and claims priority under 35 USC 119 from Japanese Patent Application No. 2023-166493 filed on Sep. 27, 2023, the entire content of which is incorporated herein by reference.

TECHNICAL FIELD

The present disclosure relates to a heater for an airbag device that is disposed to cover a vehicle interior surface side of an airbag cover in an airbag device and configured to emit radiation heat to an occupant in a vehicle interior.

BACKGROUND ART

As a heater for an airbag device, there has been one including a configuration including an interior panel corresponding to an airbag cover in an airbag device, a heater body disposed to cover the vehicle interior surface side of the airbag cover and configured to generate heat to emit the radiation heat, wherein the heater body is formed of a flex a heater body disposed on a vehicle interior surface side of the interior panel, and a skin layer covering the heater body (for example, see WO2018/116679). In the heater for an airbag device in such a related art, the skin layer covering the heater body is made of a woven fabric or a knitted fabric. In order to smoothly break the skin layer when the interior panel is opened, with an external shape of a tear portion (breakage scheduled portion) provided in the interior panel as viewed from an interior panel surface side being a zigzag shape or a shape in which unevenness is alternately connected, stress is locally concentrated on the skin layer when the tear portion breaks to break the skin layer.

However, in the heater for an airbag device in the related art, by changing the shape of the tear portion of the interior panel (a member corresponding to an airbag cover in a normal airbag device), a member (the skin layer) on a heater side is set to be easily opened when the airbag is inflated. Therefore, for example, the airbag device in the related art cannot be easily mounted and needs a design change of the airbag device itself (specifically, the airbag cover).

SUMMARY OF INVENTION

Aspects of the embodiments of the present disclosure relate to providing a heater for an airbag device that may be easily used even in an airbag device in the related art and may prevent an increase in manufacturing cost.

According to an aspect of the present disclosure, there is provided a heater for an airbag device, the airbag device including a housing portion, an airbag folded and housed in the housing portion, and an airbag cover disposed to cover the airbag and including a door portion configured to be opened to break a breakage scheduled portion disposed at a peripheral edge of the airbag cover when the airbag is deployed and inflated, the heater being disposed to cover a vehicle interior surface side of the airbag cover and configured to emit radiation heat to an occupant in the vehicle interior, the heater including:
a sheet-shaped heater body including a heat generation unit, and disposed to cover the vehicle interior surface side of the airbag cover and configured to generate heat to emit the radiation heat, in which
the heater body is formed of a flexible woven fabric including a warp and a weft, and is provided with a dividing scheduled portion configured to be divided at a time of opening of the door portion at a position corresponding to the breakage scheduled portion formed in the airbag cover,
the dividing scheduled portion is provided with, substantially along the breakage scheduled portion, main slits that are intermittently provided and sub slits disposed on at least one side of the main slits, and
the sub slits are disposed in the woven fabric to cut the warp or the weft implementing a portion of a coupling portion formed between the main slits.

In the heater for an airbag device according to the present disclosure, the heater body disposed to cover the vehicle interior surface side of the airbag cover is formed of a flexible woven fabric. The dividing scheduled portion configured to be divided when the door portion is opened due to the deployment and inflation of the airbag is formed in the heater body at a position corresponding to the breakage scheduled portion formed in the airbag cover. The dividing scheduled portion includes the main slits that are intermittently provided and the sub slit disposed on at least one side of the main slit to be substantially along the breakage scheduled portion, and the sub slit is disposed in the woven fabric to cut a warp or a weft implementing the portion of the coupling portion formed between the main slits.

That is, in the heater for an airbag device according to the present disclosure, in the heater body, the warp or the weft implementing a region covering the vicinity of the breakage scheduled portion of the airbag cover is divided in advance by the main slits and the sub slit implementing the dividing scheduled portion. Therefore, even in a configuration in which the heater body made of the woven fabric is provided, the heater body may be quickly divided at the portion of the dividing scheduled portion at the time of inflation of the airbag (at the time of breakage of the breakage scheduled portion), and may be moved together with the opening door portion after the dividing. Therefore, the airbag can be inflated without any hindrance. In the heater for an airbag device according to the present disclosure, by providing the main slits and the sub slit in the woven fabric implementing the heater body, the door portion of the airbag cover and the heater body may be quickly opened. Therefore, there is no need to change the design of the breakage scheduled portion provided in the airbag cover, and the heater may be easily used even in an airbag device of the related art.

Therefore, the heater for an airbag device according to the present disclosure may be easily used even in an airbag device in the related art, and an increase in manufacturing costs may be prevented.

Specific examples of the heater body includes a heater body obtained by using a woven fabric as a base material to support carbon nanotubes serving as a heat generation unit on the base material, and a woven fabric formed by weaving the carbon nanotubes.

In addition, a case may be described in which the woven fabric implementing the heater body is disposed in a biased state such that the warp and the weft are inclined with respect to the breakage scheduled portion of the airbag cover.

When the woven fabric implementing the heater body is disposed in the biased state, it is preferable that the sub slits are disposed on both sides of the main slit, the sub slit disposed on one side cuts one of the warp or the weft implementing the coupling portion, and the sub slit disposed on the other side cuts the other one of the warp or the weft implementing the coupling portion.

BRIEF DESCRIPTION OF DRAWINGS

Exemplary embodiment(s) of the present invention will be described in detail based on the following figures, wherein.

DESCRIPTION OF EMBODIMENTS

Figure 1:
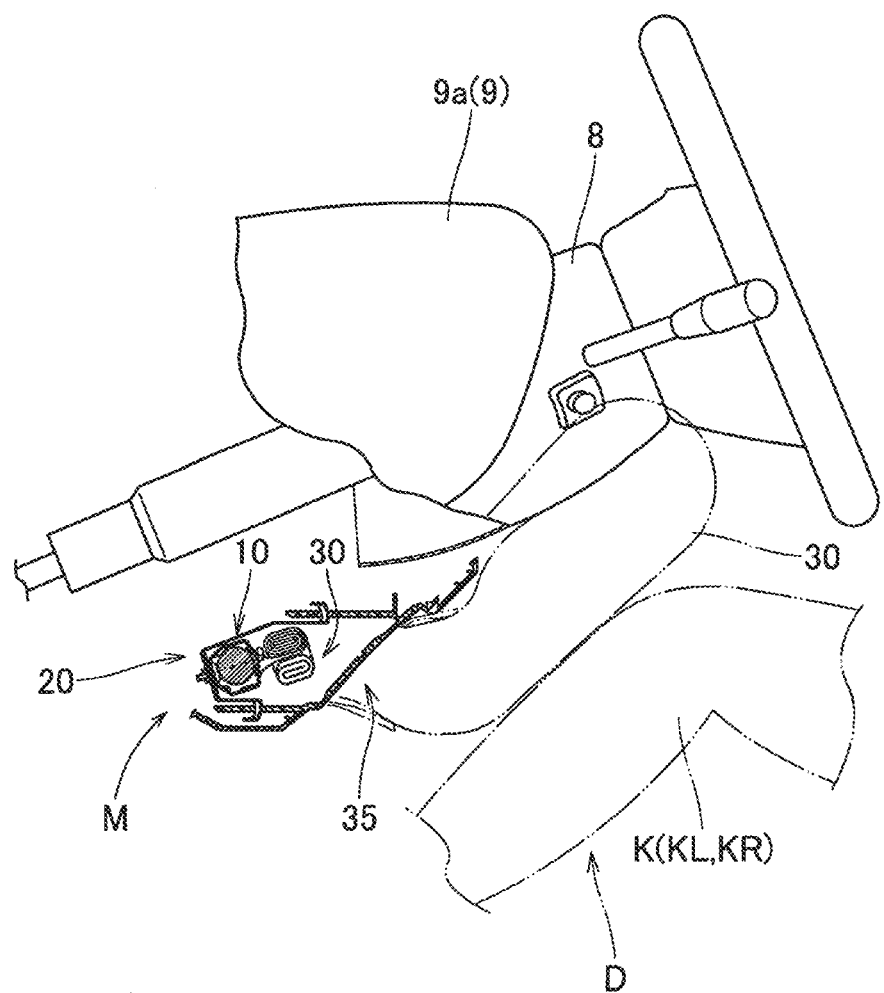
FIG. 1 is a schematic longitudinal sectional view showing a use state of a knee protection airbag device using a heater according to one embodiment of the present disclosure in a vehicle front-rear direction.

Hereinafter, one embodiment of the present disclosure will be described with reference to the drawings. In the embodiment, a heater for an airbag device (hereinafter, simply referred to as a "heater") H used in a knee protection airbag device (hereinafter, simply referred to as an "airbag device") M will be described as an example. As shown in FIG. 1, the airbag device M is disposed to be able to protect knees K (KL, KR) of an occupant (driver D) seated in a seat (driver seat in the embodiment) in a region below a steering column 8 that is a vehicle front side of the driver D. In the embodiment, unless otherwise specified, up-down, left-right, and front-rear directions are the same as up-down, left-right, and front-rear directions of a vehicle when the airbag device M is mounted on the vehicle.

Figure 2:
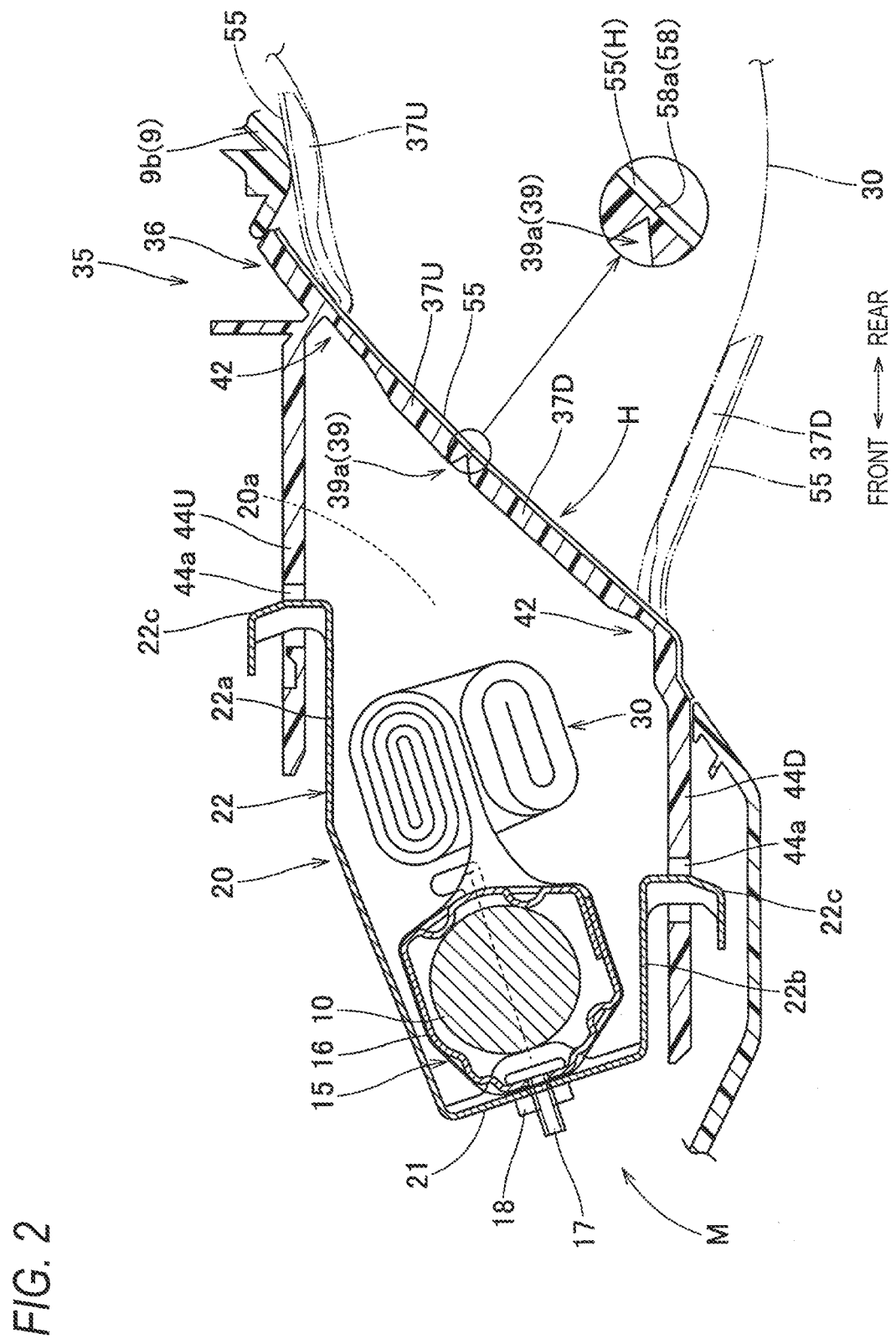
FIG. 2 is a schematic enlarged longitudinal sectional view of the knee protection airbag device shown in FIG. 1 in the vehicle front-rear direction.
Figure 3:
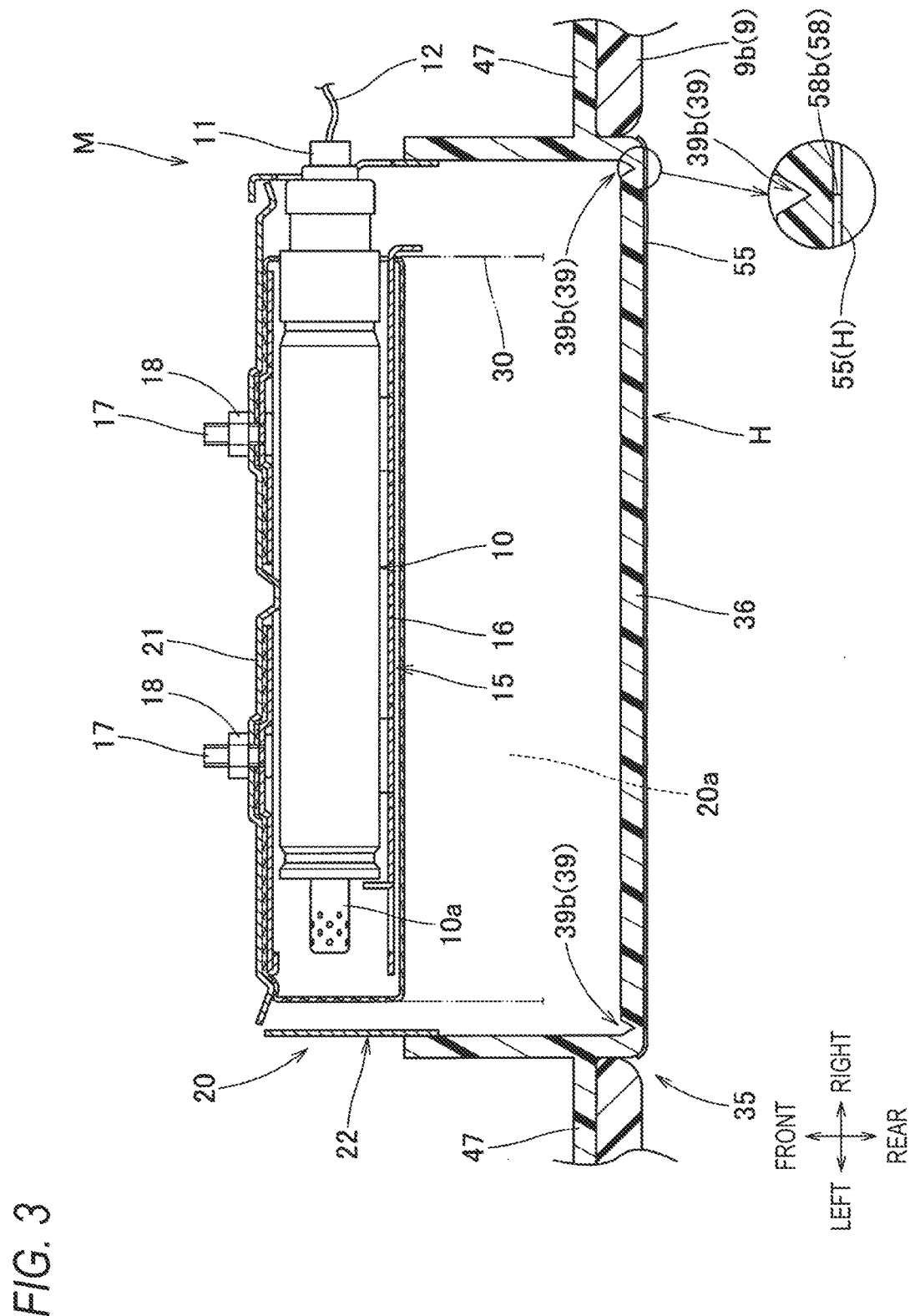
FIG. 3 is a schematic transverse sectional view of the knee protection airbag device shown in FIG. 1 in a vehicle left-right direction.

As shown in FIGS. 2 and 3, the airbag device M includes a folded airbag 30, an inflator 10 for supplying inflation gas to the airbag 30, a case 20 as a housing portion for housing the folded airbag 30 and the inflator 10, a retainer 15 for attaching the inflator 10 and the airbag 30 to the case 20 while holding the inflator 10, an airbag cover 35 covering the folded airbag 30, and a heater H disposed to cover a vehicle interior surface side (rear surface side) of the airbag cover 35.

As shown in FIGS. 2 and 3, the inflator 10 has a substantially cylindrical shape in which an axial direction is disposed substantially along a left-right direction, and is provided with a gas discharge portion 10a on a left end side in the case of the embodiment, which includes many gas discharge ports (reference numbers omitted) capable of discharging the inflation gas. A connector 11 to which a lead wire 12 for inputting an actuation signal extending from a control device (not shown) is connected is connected to a right end side of the inflator 10.

As shown in FIGS. 2 and 3, the retainer 15 holding the inflator 10 includes a substantially cylindrical holding portion 16 covering an outer peripheral side of the inflator 10 and two bolts 17, 17 protruding to be substantially orthogonal to an axial direction of the holding portion 16. In the airbag device M of the embodiment, when the inflator 10 is housed in the holding portion 16 of the retainer 15 disposed in the airbag 30 and the airbag 30 is housed in the case, the bolts 17 of the retainer 15 are caused to protrude from a bottom wall portion 21 of the case 20 to cause nuts 18 to be fastened to the bolts 17, thereby attaching the inflator 10 and the airbag 30 to the case 20.

Figure 4:
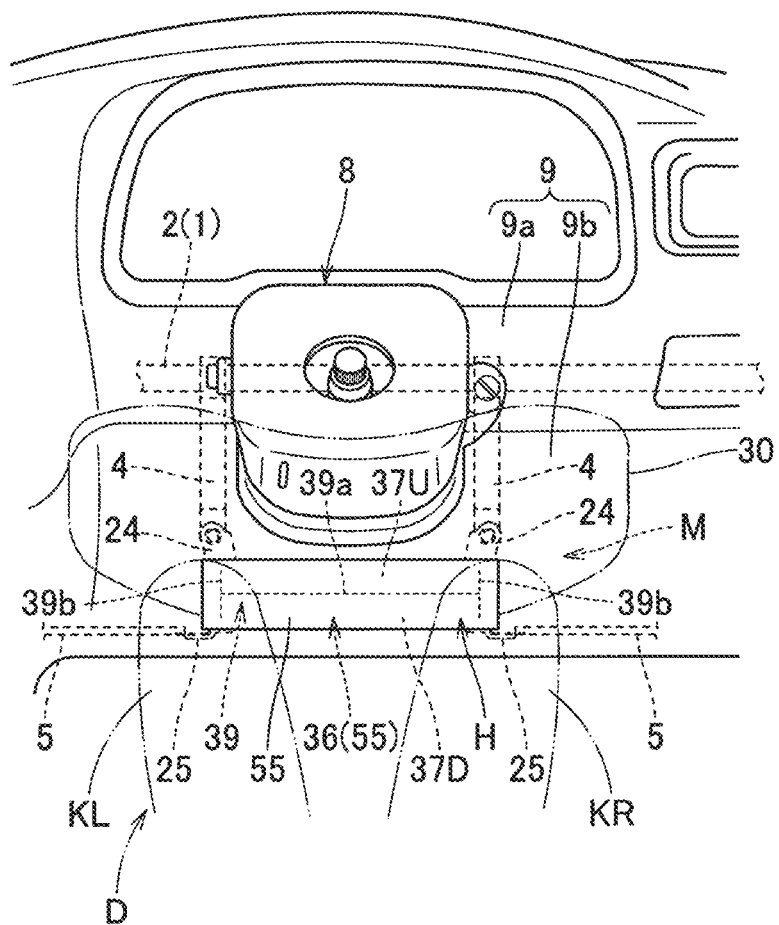
FIG. 4 is a schematic front view showing the use state of the knee protection airbag device shown in FIG. 1 as viewed from a vehicle rear side.

The case 20 as a housing portion is made of a sheet metal, includes the substantially rectangular cylindrical bottom wall portion 21 disposed on the vehicle front side and a substantially rectangular cylindrical peripheral wall portion 22 extending rearward from a peripheral edge of the bottom wall portion 21, and has a substantial box shape including a protruding opening 20a at a rear end side of the peripheral wall portion 22, through which the airbag 30 may protrude as shown in FIGS. 2 and 3. In the case of the embodiment, the case 20 is formed to be wide on the left and right, and includes locking claw portions 22c for locking attachment sheet portions 44U, 44D to be described later of the airbag cover 35 on rear end sides of an upper sidewall 22a and a lower sidewall 22b which face each other in the up-down direction in the peripheral wall portion 22. Although not shown in detail, a plurality of the locking claw portions 22c are formed along the left-right direction. Although not shown in detail, attachment brackets 24, 25 for attaching the case 20 to a body 1 side are disposed on both left and right end sides of the upper sidewall 22a and the lower sidewall 22b in the case 20 as shown in FIG. 4. As shown in FIG. 4, the attachment brackets 24 provided on an upper sidewall 22a side are coupled to brackets 4, 4 extending from an instrument panel reinforcement on the body 1 side. As shown in FIG. 4, the attachment brackets 25 provided on a lower sidewall 22b side are coupled to brackets 5, 5 extending from a center brace or a front body pillar (not shown) on the body 1 side.

The airbag 30 is formed into a bag shape formed of a flexible woven fabric made of a polyamide yarn, a polyester yarn, or the like, and can protect the knees K (KL, KR) of the driver D on the left and right sides with a shape at the time of inflation completion being a substantially elongated rectangular plate shape as shown by two-dot chain lines in FIGS. 1 and 4.

The airbag cover 35 is disposed to cover a vehicle rear side of the airbag 30 folded and housed in the case 20, and specifically, may cover a vehicle rear side of the case 20. In the case of the embodiment, as shown in FIG. 4, the airbag cover 35 is made of a thermoplastic elastomer such as a polyolefin, and is disposed at a position below the steering column 8 when viewed from the vehicle rear side and on a side of a lower panel 9b of an instrument panel 9 including an upper panel 9a and the lower panel 9b. As shown in FIG. 1, the airbag cover 35 is disposed at a position in front of the knees K of the driver D seated in the driver seat. In the case of the embodiment, the airbag cover 35 includes a door disposition portion 36 disposed in the vicinity of the protruding opening 20a of the case 20 and peripheral edge portions 47 extending around the door disposition portion 36.

The door disposition portion 36 includes door portions 37U, 37D arranged side by side in the up-down direction to cover the protruding opening 20a of the case 20, hinge portions 42 and a breakage scheduled portion 39 that are disposed around the door portions 37U, 37D, and the attachment sheet portions 44U, 44D extending forward from an upper end side of the door portion 37U on an upper side and a lower end side of the door portion 37D on a lower side, respectively. The two door portions 37U, 37D cover the vehicle rear side of the protruding opening 20a and open to both upper and lower sides at the time of opening. The breakage scheduled portion 39 disposed around the door portions 37U, 37D has a substantially H shape when viewed from the vehicle rear side (see FIG. 4). The breakage scheduled portion 39 is formed by recessing the door disposition portion 36 from a back surface side (the vehicle front side), and is formed by recessing the door disposition portion 36 into an approximately V-shaped cross section as shown in FIGS. 2 and 3 in the case of the embodiment. The breakage scheduled portion 39 is implemented by continuously disposing such a recess over the entire length. To describe in detail the breakage scheduled portion 39, the breakage scheduled portion 39 includes a lateral bar portion 39a disposed in a straight line shape substantially along the left-right direction between the door portions 37U, 37D and two vertical bar portions 39b, 39b disposed on the left and right sides of the door portions 37U, 37D on the upper and lower sides to extend from the lateral bar portion 39a in the up-down direction. Each of the vertical bar portions 39b is formed in a straight line shape substantially along the up-down direction to be substantially orthogonal to the lateral bar portion 39a (see FIG. 4). As shown in FIG. 2, the hinge portions 42 are disposed on the upper end side of the door portion 37U on the upper side and the lower end side of the door portion 37D on the lower side. Each of the door portions 37U, 37D is opened using the hinge portion 42 with the hinge portion 42 as a rotation center when opening. The attachment sheet portions 44U, 44D are disposed to be respectively adjacent to outer peripheral sides of the upper sidewall 22a and the lower sidewall 22b in the case 20 and protrude toward the vehicle front side, and each include a locking claw portion 44a for locking the locking claw portion 22c formed in the case 20.

The peripheral edge portions 47 are formed in a stepped shape to be located one step forward of the door portions 37U, 37D at portions on both left and right sides of the door disposition portion 36, support portions of the lower panel 9b which are disposed on both the left and right sides of the door portions 37U, 37D such that surfaces of the door portions 37U, 37D and the lower panel 9b on the vehicle rear side are substantially flush with each other (see FIG. 3).

The heater H disposed to cover the vehicle interior surface side (rear surface side) of the airbag cover 35 may emit radiation heat to the occupant (in the case of the embodiment, the driver D seated in the driver seat) in the vehicle interior when activated. In the case of the embodiment, as shown in FIGS. 2 and 3, the heater H is disposed to cover substantially the entire rear surface side of the door disposition portion 36 in the airbag cover 35. The heater H is entirely in a flexible sheet shape, and in the embodiment, an overall thickness is set to about 20 μm to 2 mm.

Figure 5:
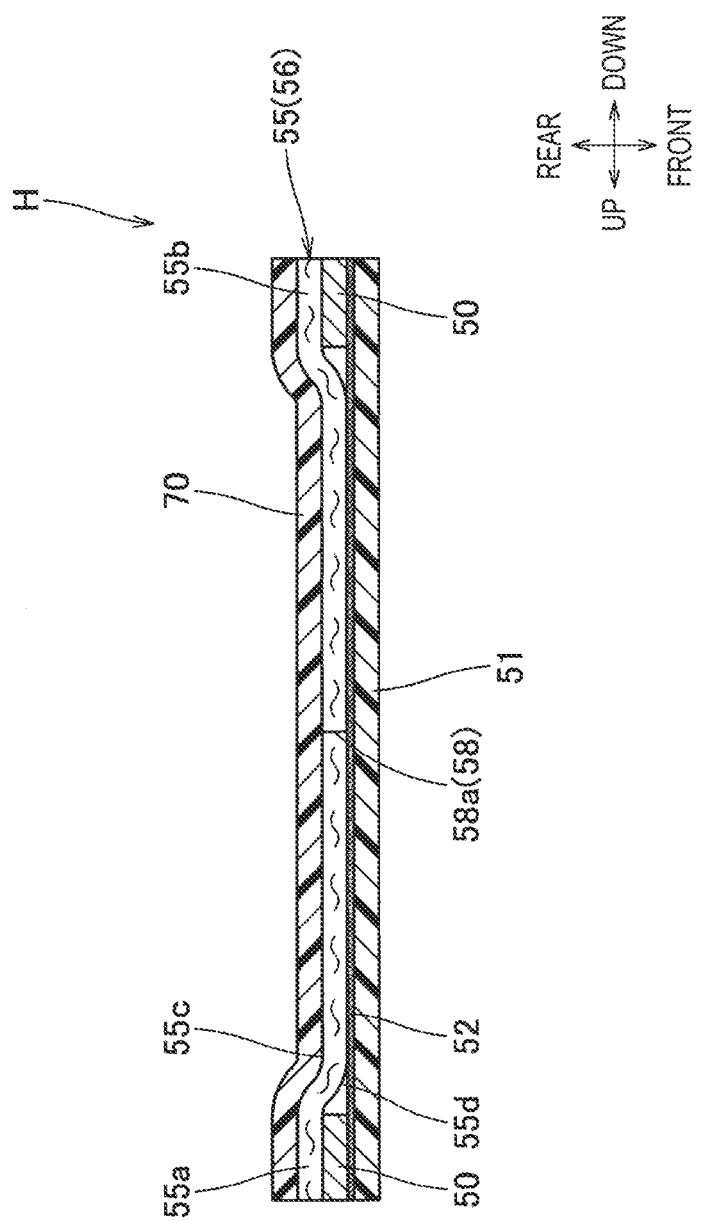
FIG. 5 is a schematic sectional view of the heater according to the embodiment.

As shown in the schematic cross section of FIG. 5, the heater H includes a heater body 55 formed in a sheet shape, electrode portions 50 disposed around the heater body 55, a heat insulating layer 51 disposed on the front surface side (airbag cover 35 side) when being mounted on the vehicle, and a coating layer 70 disposed on the rear surface side (driver D side) when being mounted on the vehicle. The heater body 55 and the electrode portions 50 are integrated with the heat insulating layer 51 by interposing an adhesive layer 52 therebetween. In the case of the embodiment, the heater H has an external shape that is substantially the same as the external shape of the door disposition portion 36 of the airbag cover 35 when viewed from the vehicle rear side, is shaped to be able to cover substantially the entire rear surface side of the door disposition portion 36, and in detail, has a substantially rectangular plate shape that is wide in the left-right direction.

In the embodiment, the electrode portion 50 is formed of a metal foil (specifically, copper foil in the case of the embodiment) formed in a strip shape. In the embodiment, the electrode portions 50 are disposed continuously over substantially the entire left and right regions on the upper end side and the lower end side of the heater H (the heater body 55) (see FIG. 6). In the embodiment, as shown in FIG. 5, the electrode portions 50 are disposed on an upper edge 55a side and a lower edge 55b side of the heater body 55 to overlap with a surface on the airbag cover 35 side (back surface 55d side). In FIG. 5, it is described that there seems to be a step due to the thickness of electrode portion 50. In an actual product, the electrode portion 50 is thin and such a step hardly exists. Each electrode portion 50 is disposed at a position (a position not overlapping the breakage scheduled portions 39) above or below the door portions 37U, 37D when being mounted on the vehicle. Each electrode portion 50 is electrically connected to a control device (not shown) via a lead wire 50a (see FIG. 6) formed to extend from one end side. When energized, the electrode portion 50 generates heat within the electrode portion 50 itself, and at the same time, carbon nanotubes to be described later, which serve as a heat generation unit provided in the heater body 55, are also energized and generates heat.

The heat insulating layer 51 is used for reflecting the heat generated when the electrode portion 50 is energized while preventing the heat from propagating to the airbag cover 35 side to efficiently emit the heat to the driver D side. In the embodiment, although not shown in detail, the heat insulating layer 51 is formed of a nonwoven fabric in which aluminum foil (metal foil) is deposited on one surface, and is disposed such that the aluminum foil is located on a heater body 55 side. As shown in FIG. 5, the heat insulating layer 51 is disposed to cover substantially the entire surface on a vehicle front surface side (the airbag cover 35 side) of the heater body 55 and the electrode portions 50. A material for forming the heat insulating layer 51 is not limited to that in the embodiment. As the heat insulating layer, a glass fiber, a silica fiber, a fluorine fiber, a fiber such as BASHFIBER (registered trademark), and a base material such as an urethane foam with a metal foil vapor-deposited thereon may be used.

The heater body 55 includes the heat generation unit and is formed of a flexible woven fabric. In the embodiment, the heater body 55 is implemented such that a woven fabric is used as a base material 56 and the carbon nanotubes serving as the heat generation unit is supported on the base material 56. The heater body 55 has an external shape that is substantially the same as the external shape of the heater H, that is, substantially the same as the external shape of the door disposition portion 36 of the airbag cover 35 when viewed from the vehicle rear side, and is shaped to be able to cover the entire surface on the rear surface side of the door disposition portion 36. That is, as shown in FIG. 6, the external shape of the heater body 55 (base material 56) has a substantially rectangular shape that is wide in the left-right direction.

In the embodiment, a woven fabric obtained by weaving an original yarn made of a polyamide yarn or a polyester yarn by plain weave is used as the base material 56. In detail, as shown in FIG. 7, the base material 56 is obtained by causing a fine line (warp VT and weft HT) of the woven fabric to be along a bias direction (intersecting at an angle of) 45° and cutting it into a predetermined shape. That is, the base material 56 is disposed in a biased state such that the warp VT and the weft HT are inclined with respect to a dividing scheduled portion 58 to be described later. As shown in FIG. 6, the dividing scheduled portion 58, which may be divided when the door portions 37U, 37D are opened, is formed on the base material 56 at a position corresponding to the breakage scheduled portion 39 formed in the door disposition portion 36 of the airbag cover 35. That is, the dividing scheduled portion 58 is formed in a flat and substantially H shape in a state in which the base material 56 is flatly deployed to correspond to the breakage scheduled portion 39. Specifically, the dividing scheduled portion 58 includes a lateral bar portion 58a disposed corresponding to the lateral bar portion 39a of the breakage scheduled portion 39 and vertical bar portions 58b disposed corresponding to the vertical bar portions 39b of the breakage scheduled portion 39. In a vehicle mounted state, the lateral bar portion 58a is formed at a position substantially coincident with the lateral bar portion 39a of the breakage scheduled portion 39 in the front-rear direction (see FIG. 2), and is formed in a straight line shape extending substantially along the left-right direction over the entire length of the lateral bar portion 39a. In the vehicle mounted state, the vertical bar portions 58b are formed at positions substantially coincident with the vertical bar portions 39b of the breakage scheduled portion 39 in the front-rear direction (see FIG. 3), and is formed in a straight line shape extending substantially along the up-down direction from the lateral bar portion 58a. The vertical bar portion 58b is also formed over the entire length of the vertical bar portion 39b.

Figure 6:
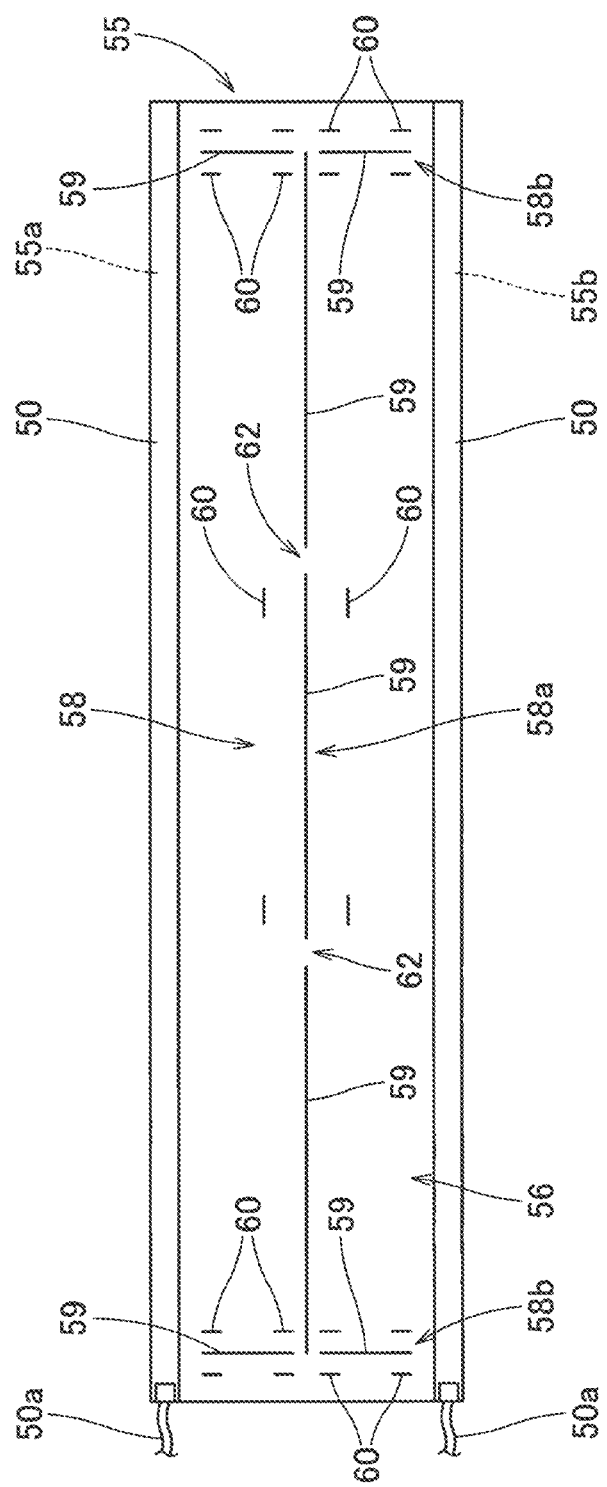
FIG. 6 is a schematic rear view (a view viewed from a back surface side) showing a heater body and an electrode portion in the heater according to the embodiment.
Figure 7:
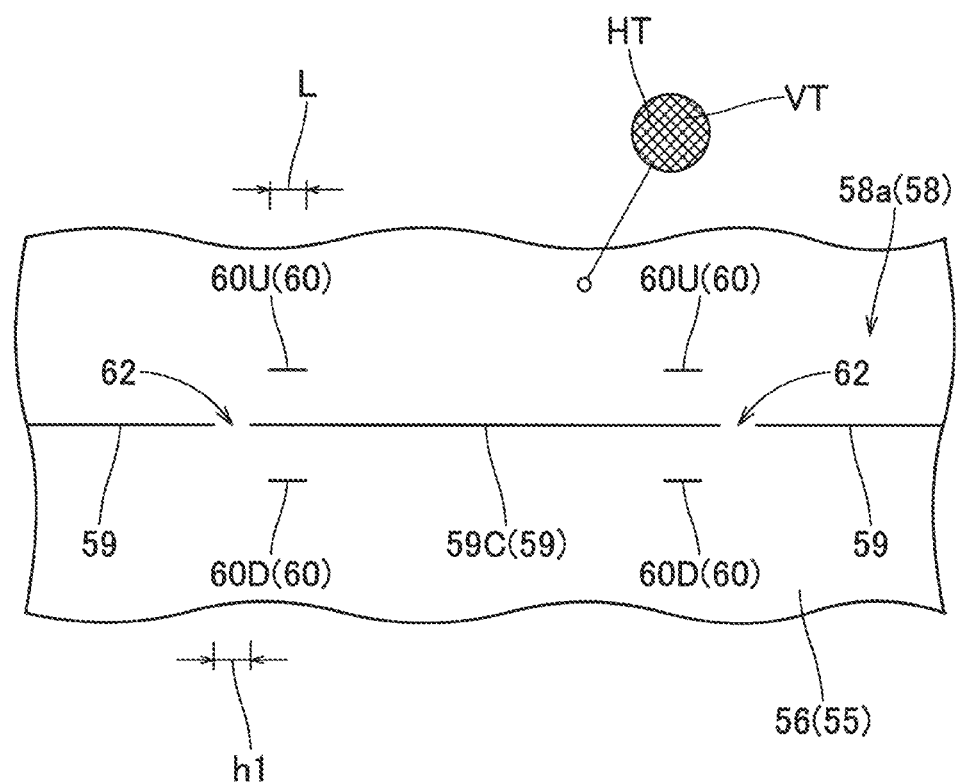
FIG. 7 is a partially enlarged plan view showing a portion of a dividing scheduled portion of a base material in the heater body according to the embodiment.

As shown in FIG. 6, the dividing scheduled portion 58 includes main slits 59 that are intermittently provided and sub slits 60 that are disposed on at least one side of the main slit 59 to be substantially along the breakage scheduled portion 39. In the base material 56 of the embodiment, the sub slits 60 are disposed on both sides of the main slit 59. In the embodiment, three of the main slits 59 are arranged side by side on the lateral bar portion 58a, and two of the main slits 59 are arranged side by side on each vertical bar portion 58b. The sub slits 60 are formed at positions on the upper and lower sides of the main slit 59 in a region of the lateral bar portion 58a, and are formed at positions on the left and right sides of the main slit 59 in a region of the vertical bar portion 58b. The sub slit 60 is disposed on the base material 56 to cut the warp VT or the weft HT constituting a portion of a coupling portion 62 formed between the main slits 59, 59.

When the main slits 59 and the sub slits 60 formed in the region of the lateral bar portion 58a are described in detail as an example, the main slits 59 and the sub slits 60 are both formed on the base material 56 to form a linear cuts that extend substantially along the left-right direction. The base material 56 (woven fabric) implementing the heater body 55 is implemented such that the fine line is caused to be along the bias direction (such that the warp and the weft are inclined at 45° with respect to the main slit 59 and the sub slit 60). In the region of the main slit 59, the warp VT and the weft HT are both cut. As shown in FIG. 7, the sub slits 60 are formed at four locations which are slightly apart from the main slits 59 in the up-down direction and inward of ends on the left-right direction of a main slit 59C disposed on a center side, to correspond to the two coupling portions 62 formed between the three main slits 59 disposed in the region of the lateral bar portion 58a. The sub slits 60 are formed to be symmetrical in the up-down and left-right directions around a center of the main slit 59C disposed on the center side. Each sub slit 60 is disposed to cut the warp VT or the weft HT implementing the portion of the coupling portion 62 (a region between ends of the main slips 59, 59 on the base material 56) formed between the main slips 59, 59. Specifically, each sub slit 60 is formed at an angle of 45° above and below the coupling portion 62 to be able to cut the warp VT or the weft HT (inclined at an angle of 45° with respect to the main slit 59) implementing the coupling portion 62, and is set to have a length dimension L approximately equal to a width dimension h1 of the coupling portion 62 (slightly larger than the width dimension h1 of the coupling portion 62) (see FIG. 7). Sub slits 60U (60) disposed above the coupling portions 62 cut one (specifically, the warp VT) of the warp VT or the weft HT implementing the portion of the coupling portion 62, and sub slits 60D (60) disposed below the coupling portions 62 cut the other (specifically, the weft HT) of the warp VT or the weft HT implementing the portion of the coupling portion 62. That is, in the base material 56 (the heater body 55) of the embodiment, in the region of the lateral bar portion 58a implementing the dividing scheduled portion 58, both the warp VT and the weft HT are cut in advance over substantially the entire length of the lateral bar portion 58a by the main slits 59 and the sub slits 60U, 60D. Although detailed description is omitted, the sub slits 60 are similarly configured even in the regions of the two vertical bar portions 58b implementing the dividing scheduled portion 58, and even in the regions of the two vertical bar portions 58b, the warp VT and the weft HT are both cut in advance by the main slits 59 and the sub slits 60. That is, in the base material 56 (the heater body 55) of the embodiment, the warp VT and the weft HT implementing the base material 56 are cut in advance over substantially the entire region of the dividing scheduled portion 58.

Figure 8:
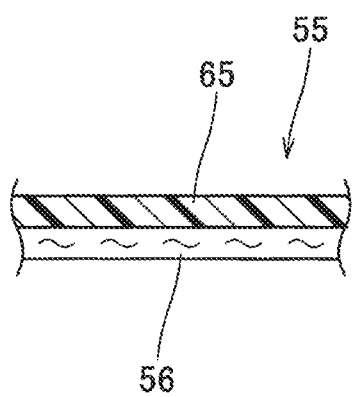
FIG. 8 is a partially enlarged schematic sectional view of the heater body according to the embodiment.

In the heater body 55 according to the embodiment, the carbon nanotubes serving as the heat generation unit are supported on the base material 56 by heat transfer. Specifically, in the embodiment, the carbon nanotubes are supported on the base material 56 by printing a dispersion solution in which short fibers are dispersed in a solvent made of a cellulose-based solvent or a urethane-based solvent on a predetermined heat transfer sheet, followed by being thermally transferred onto the surface of the base material 56 (the surface on the driver D side) to form a coating layer 65 (see FIG. 8). Specifically, in the embodiment, the coating layer 65 is formed on the surface of the base material 66 using a dispersion solution containing the carbon nanotube of about 5 wt % to 6 wt %. A method of supporting the carbon nanotubes on the base material 56 is not limited to the formation of the coating layer 65 by the heat transfer. For example, carbon nanotubes in a state of being dispersed in a solvent may be appropriately applied to a base material by a predetermined coating method and dried to be supported on the base material. In the heater body 55 of the embodiment, after the carbon nanotubes are supported (after the coating layer 65 is formed), the dividing scheduled portion 58 is formed on the base material 56. In the embodiment, the carbon nanotubes are used as the heat generation unit, and the heat generation unit is not limited to carbon nanotubes. Examples of the heat generation unit include graphene, a carbon fiber (carbon), and an ink (silver nano-ink) containing silver particles. From a viewpoint that the carbon nanotubes may be supported on the base material (woven fabric) and used easily and may be manufactured with a relatively low cost, it is desirable that the carbon nanotubes are used as the heat generation unit and supported on the base material.

The coating layer 70 is disposed over the entire surface of the heater body 55 to cover a surface (a surface 55c) of the heater body 55 on an occupant side (see FIG. 5), and is made of a insulating material. In the embodiment, the coating layer 70 is formed of a urethane-based paint. In the embodiment, the coating layer 70 is colored in black in consideration of design.

In the heater H according to the embodiment, an adhesive layer (not shown) is appropriately provided on a back surface (a surface on the airbag cover 35 side) of the heat insulating layer 51, is attached to cover a rear surface (vehicle interior surface) side of the door disposition portion 36 in the airbag cover 35, and is mounted on the vehicle together with the airbag device M. When being mounted on the vehicle, the electrode portion 50 of the heater H is electrically connected to the control device (not shown) via the lead wire 50a.

Figure 9:
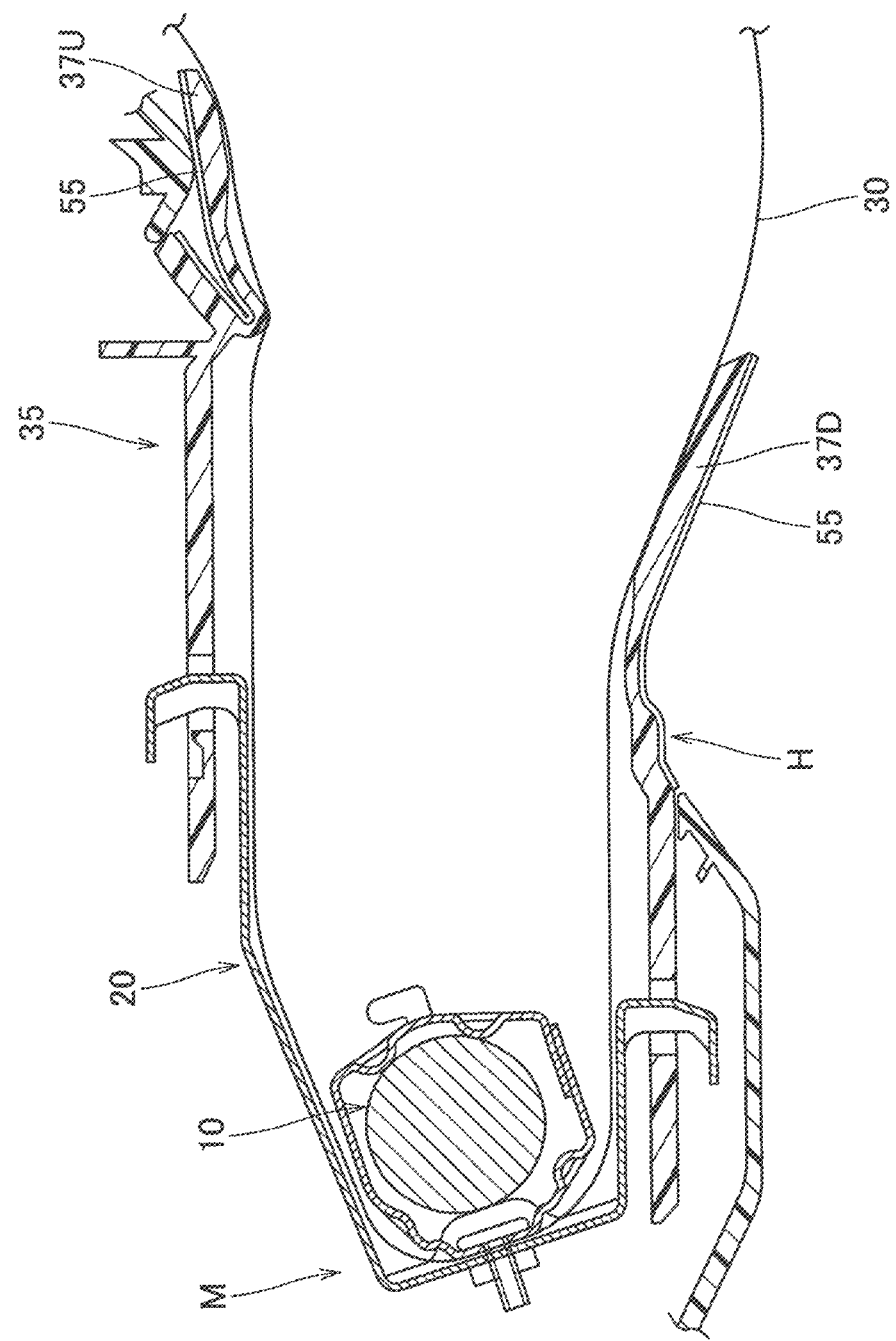
FIG. 9 is a schematic enlarged longitudinal sectional view in the vehicle front-rear direction showing a state in which an airbag is inflated completely in the knee protection airbag device shown in FIG. 1.

Then, after the airbag device M is mounted on the vehicle, when the actuation signal is input to the inflator 10 via the lead wire 12, the inflation gas is discharged from the gas discharge portion 10a of the inflator 10 and flows into the airbag 30. Then, the door portions 37U, 37D of the airbag cover 35 are pressed by the airbag 30 which is inflated with the inflation gas flowing thereinto, and are opened in the up-down direction with the hinge portions 42, 42 as the rotation center while breaking the surrounding breakage scheduled portion 39. At this time, the heater body 55 in the heater His also divided at the portion of the dividing scheduled portion 58 formed on the base material 56, and moves together with the door portions 37U, 37D. Then, the airbag 30 protrudes toward the vehicle rear side from the protruding opening 20a of the case 20, and the inflation is completed as shown by the two-dot chain lines of FIGS. 2 and 3 and FIG. 9.

In the heater H according to the embodiment, the heater body 55 disposed to cover the vehicle interior surface side of the airbag cover 35 (specifically, the door disposition portion 36) is formed of a flexible woven fabric (the base material 56). The dividing scheduled portion 58, which may be divided when the door portions 37U, 37D are opened during the deployment and inflation of the airbag 30, is formed in the heater body 55 at a position corresponding to the breakage scheduled portion 39 formed on the door disposition portion 36 of the airbag cover 35. The dividing scheduled portion 58 includes the main slits 59 which are intermittently provided and the sub slits 60 which are disposed on at least one side of the main slit 59 to be substantially along the breakage scheduled portion 39 (specifically, the lateral bar portion 39a and the vertical bar portions 39b implementing the breakage scheduled portion 39). In the woven fabric (the base material 56), the sub slit 60 is disposed to cut the warp VT or the weft HT that implements the portion of the coupling portion 62 formed between the main slits 59. That is, in the heater H according to the embodiment, in the base material 56 implementing the heater body 55, the warp VT or the weft HT implementing the region covering the vicinity of the breakage scheduled portion 39 of the airbag cover 35 is divided in advance by the main slits 59 and the sub slits 60 implementing the dividing scheduled portion 58. Therefore, even in a configuration in which the heater body 55 made of the woven fabric is provided, the heater body 55 may be quickly divided at the portion of the dividing scheduled portion 58 at the time of inflation of the airbag 30 (at the time of breakage of the breakage scheduled portion 39), and may be moved together with the opening door portions 37U, 37D after the dividing (see FIG. 9). Therefore, the airbag 30 may be inflated without any hindrance. In the heater H according to the embodiment, by providing the main slits 59 and the sub slits 60 on the woven fabric (the base material 56) implementing the heater body 55, the door portions 37U, 37D of the airbag cover 35 and the heater body 55 may be quickly opened. Therefore, there is no need to change the design of the breakage scheduled portion 39 provided in the airbag cover 35, and the heater H may be easily used even in an airbag device in the related art.

Therefore, the heater H according to the embodiment may be easily used even in an airbag device in the related art, and an increase in manufacturing costs may be prevented.

In the heater H according to the embodiment, the heater body 55 is implemented such that the woven fabric is used as the base material 56 and the carbon nanotubes serving as the heat generation unit are supported on the base material 56. Therefore, the heater H may be manufactured relatively cheaply and easily. In particular, in the embodiment, the carbon nanotubes are supported on the base material 56 by the heat transfer, which makes the manufacturing easy. Of course, the heater body is not limited to that of the embodiment, and may also be formed of a woven fabric in which the carbon nanotubes serving as the heat generation unit are woven.

In the heater H according to the embodiment, the base material 56 implementing the heater body 55 is obtained by causing a fine line (warp VT and weft HT) of the woven fabric to be along the bias direction (intersecting at an angle of 45°) and cutting it into a predetermined shape. That is, the base material 56 is disposed in a biased state such that the warp VT and the weft HT are inclined with respect to a dividing scheduled portion 58 to be described later. Therefore, in the heater H according to the embodiment, since the heater body 55 easily extends in the up-down direction or the left-right direction, it is easy to follow the surface of the airbag cover 35, the occurrence of wrinkles may be minimized, and the heater H may be mounted with good design compared to using a base material cut with the warp VT approximately along the up-down direction. In the heater H according to the embodiment, the sub slits 60 in the dividing scheduled portion 58 are disposed on both sides of the main slit 59, and one of the sub slits 60 cuts one of the warp VT or the weft HT implementing the coupling portion 62, and the other cuts the other of the warp VT or the weft HT implementing the coupling portion 62. That is, in the heater H according to the embodiment, the warp VT and the weft HT are cut in advance by the main slit 59 and the sub slit 60, and the warp VT and the weft HT implementing the base material 56 are cut in advance over substantially the entire region of the dividing scheduled portion 58. Therefore, even in a configuration in which the base material 56 cut in the bias direction is used, the heater body 55 may be divided at the portion of the dividing scheduled portion 58 quickly and stably at the time of inflation of the airbag 30 (at the time of breakage of the breakage scheduled portion 39). In this way, even in a configuration in which the warp VT and the weft HT implementing the base material 56 are cut in advance over substantially the entire region of the dividing scheduled portion 58, since the warp VT and the weft HT are cut by the main slit 59 and the sub slits 60 disposed on the sides of the main slit 59, such cut portions are not noticeable when being mounted on the vehicle, and the design when mounted on the vehicle is also good.

Figure 10:
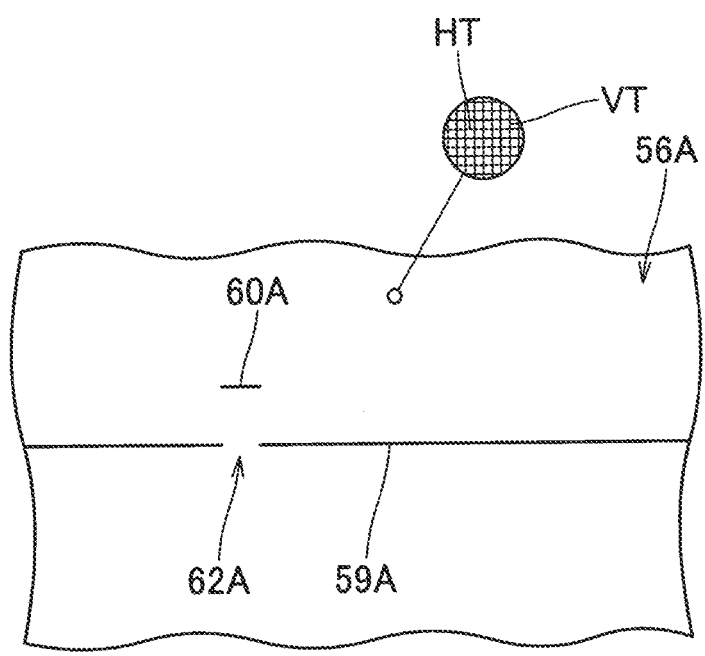
FIG. 10 is a partially enlarged plan view of a base material implementing a heater body according to another embodiment.

If such a point is not taken into consideration, as shown in FIG. 10, a base material member 56A obtained by cutting the warp VT along the up-down direction and cutting the weft HT along the left-right direction may be used. When using such a base material 56A, a sub slit 60A may be disposed on only one side of a main slit 59A (only on an upper side in FIG. 10) to cut one implementing the coupling portion 62A, which is the warp VT.

In the embodiment, the knee protection airbag device disposed in front of the driver seat is explained as an example of the airbag device using the heater H. However, the airbag device capable of mounting the heater according to the present invention is not limited to the embodiment. Of course, the heater according to the present invention may also be used in a knee protection airbag device disposed in front of a passenger seat, and may also be used, for example, in an airbag device for a steering wheel mounted on a steering wheel. When used in an airbag device for a steering wheel, the heater is disposed to cover a surface side of an airbag cover (pad) in the steering wheel.

What is claimed is:

1. A heater for an airbag device, the airbag device including a housing portion, an airbag folded and housed in the housing portion, and an airbag cover disposed to cover the airbag and including a door portion configured to be opened to break a breakage scheduled portion disposed at a peripheral edge of the airbag cover when the airbag is deployed and inflated, the heater being disposed to cover a vehicle interior surface side of the airbag cover and configured to emit radiation heat to an occupant in the vehicle interior,
   the heater comprising:
      a sheet-shaped heater body including a heat generation unit, and disposed to cover the vehicle interior surface side of the airbag cover and configured to generate heat to emit the radiation heat, wherein
      the heater body is formed of a flexible woven fabric including a warp and a weft, and is provided with a dividing scheduled portion configured to be divided at a time of opening of the door portion at a position corresponding to the breakage scheduled portion formed in the airbag cover,
      the dividing scheduled portion is provided with, substantially along the breakage scheduled portion, main slits that are intermittently provided and sub slits disposed on at least one side of the main slits, and
      the sub slits are disposed in the woven fabric to cut the warp or the weft implementing a portion of a coupling portion formed between the main slits.

2. The heater for an airbag device according to claim 1, wherein
   the heater body is configured to support a carbon nanotube serving as the heat generation unit on the woven fabric serving as a base material.

3. The heater for an airbag device according to claim 1, wherein
   the heater body is formed of the woven fabric formed by weaving a carbon nanotube serving as the heat generation unit.

4. The heater for an airbag device according to claim 1, wherein
   the woven fabric is disposed in a biased state such that the warp and the weft are inclined with respect to the dividing scheduled portion.

5. The heater for an airbag device according to claim 4, wherein
   the sub slits are disposed on both sides of the main slits, and
   the sub slits disposed on one side are configured to cut one of the warp or the weft implementing the coupling portion, and the sub slits disposed on the other side are configured to cut the other of the warp or the weft implementing the coupling portion.

6. An airbag device comprising:
   an airbag;
   a housing portion in which the airbag is folded and housed;
   an airbag cover that covers the folded airbag; and
   a heater disposed to cover a vehicle interior surface side of the airbag cover, wherein
   the heater includes a sheet-shaped heater body disposed to cover the vehicle interior surface side of the airbag cover and configured to generate heat and emit radiation heat,
   the airbag cover includes a door portion configured to be opened to break a breakage scheduled portion disposed at a peripheral edge of the airbag cover when the airbag is deployed and inflated,
   the heater body is formed of a flexible woven fabric including a warp and a weft, includes a heat generation unit, and is provided with a dividing scheduled portion configured to be divided at a time of opening of the door portion at a position corresponding to the breakage scheduled portion formed in the airbag cover,
   the dividing scheduled portion includes, substantially along the breakage scheduled portion, main slits that are intermittently provided and sub slits disposed on at least one side of the main slit, and
   the sub slits are disposed in the woven fabric to cut the warp or the weft implementing a portion of a coupling portion formed between the main slits.

* * * * *